(12) United States Patent  (10) Patent No.: US 6,901,517 B1
Redmore  (45) Date of Patent: May 31, 2005

(54) HARDWARE BASED SECURITY GROUPS, FIREWALL LOAD SHARING, AND FIREWALL REDUNDANCY

(75) Inventor: Seth Redmore, Palo Alto, CA (US)

(73) Assignee: Marconi Communications, Inc., Warrendale, PA (US)

( * ) Notice: Subject to any disclaimer, the term of this patent is extended or adjusted under 35 U.S.C. 154(b) by 0 days.

(21) Appl. No.: 09/356,086

(22) Filed: Jul. 16, 1999

(51) Int. Cl.$^7$ .......................... G06F 12/00; G06F 9/44; H04L 12/66

(52) U.S. Cl. ....................... 713/201; 713/202; 370/252; 717/101

(58) Field of Search ............................... 713/200, 201, 713/202; 717/101; 370/252; 709/227, 244, 245

(56) References Cited

U.S. PATENT DOCUMENTS

| | | | | |
|---|---|---|---|---|
| 5,124,984 A | * | 6/1992 | Engel | 370/230 |
| 5,742,587 A | * | 4/1998 | Zornig et al. | 370/235 |
| 5,841,775 A | * | 11/1998 | Huang | 370/422 |
| 5,884,025 A | * | 3/1999 | Baehr et al. | 713/201 |
| 5,983,270 A | * | 11/1999 | Abraham et al. | 709/224 |
| 5,987,606 A | * | 11/1999 | Cirasole et al. | 713/200 |
| 6,006,259 A | * | 12/1999 | Adelman et al. | 709/223 |
| 6,032,259 A | * | 2/2000 | Nemoto | 713/201 |
| 6,047,322 A | * | 4/2000 | Vaid et al. | 709/224 |
| 6,234,111 B1 | * | 5/2001 | Ulman et al. | 119/54 |
| 6,266,335 B1 | * | 7/2001 | Bhaskaran | 370/399 |
| 6,282,586 B1 | * | 8/2001 | Bullough | 710/18 |
| 6,324,613 B1 | * | 11/2001 | Aguilar et al. | 710/316 |
| 6,345,299 B2 | * | 2/2002 | Segal | 709/229 |
| 6,347,338 B1 | * | 2/2002 | Segal | 709/229 |
| 6,359,879 B1 | * | 3/2002 | Carvey et al. | 370/351 |
| 6,718,535 B1 | * | 4/2004 | Underwood | 717/101 |
| 6,754,181 B1 | * | 6/2004 | Elliott et al. | 370/252 |
| 6,766,454 B1 | * | 7/2004 | Riggins | 713/185 |
| 2001/0014912 A1 | * | 8/2001 | Segal | 709/223 |
| 2001/0023451 A1 | * | 9/2001 | Hericourt | 709/232 |
| 2002/0073337 A1 | * | 6/2002 | Ioele et al. | 713/201 |

OTHER PUBLICATIONS

Stein, Lincoln D., Web Security, a step by step guide, Addison–Wesley pub., 7$^{th}$. ed., 1997, pp. 389–391, 394–396, 402–411.*

W. Richard Stevens, TCP/IP Illustrated, vol. 1 The Protocols., Addison–Wesley, pp. 12–13, 37–38, 40–41, Jul. 1999.*

* cited by examiner

Primary Examiner—Norman M. Wright
(74) Attorney, Agent, or Firm—Ansel M. Schwartz

(57) ABSTRACT

A secure telecommunications system includes an external network and an internal network on which traffic travels. The system includes a switch connected to the network. The system includes a first inspection engine and a second inspection engine which are connected to the switch, which receive traffic from the switch, process the traffic to determine whether it is desired traffic or undesired traffic, which prevent undesired traffic from passing through it and which sends desired traffic back to the switch. The system includes a first destination connected to the switch which receives desired traffic from the switch that has been processed by the first inspection engine. The system includes a second destination connected to the switch which receives desired traffic from the switch that has been processed by the second inspection engine. A method for sending traffic over a secure telecommunications system.

20 Claims, 2 Drawing Sheets

HARDWARE BASED SECURITY GROUPS, FIREWALL LOAD SHARING, AND FIREWALL REDUNDANCY

FIELD OF THE INVENTION

The present invention is related to firewalls. More specifically, the present invention is related to firewalls connected by a switch to destinations.

BACKGROUND OF THE INVENTION

Certain types of network traffic in certain applications need to be inspected by a device which has lots of flexibility; e.g. a processor. The primary example of this is security, whereby every flow coming through a secured point (firewall) must be inspected to some greater or lesser degree. Hardware-based systems tend to be very fast, but don't deal well with very complex operations. Hence, software-based (processor-based) systems are still the norm, even with all of their concomitant performance problems. Fore instance, see U.S. Pat. No. 5,699,513, incorporated by reference herein.

Even in a system where a single processor is fast enough, if that processor dies, then the whole system grinds to a standstill. This is highly undesirable in a mission critical application (or in any application for that matter).

SUMMARY OF THE INVENTION

The present invention pertains to a secure telecommunications system. The system comprises a network on which traffic travels. The system comprises a switch connected to the network. The system comprises a first inspection engine connected to the switch, which receives traffic from the switch, processes the traffic to determine whether it is desired traffic or undesired traffic, which prevents undesired traffic from passing through it and which sends desired traffic back to the switch. The system comprises a second inspection engine connected to the switch, which receives traffic from the switch, processes the traffic to determine whether it is desired traffic or undesired traffic, which prevents undesired traffic from passing through it and which sends desired traffic back to the switch. The system comprises a first destination connected to the switch which receives desired traffic from the switch that has been processed by the first inspection engine. The system comprises a second destination connected to the switch which receives desired traffic from the switch that has been processed by the second inspection engine.

The present invention pertains to a method for sending traffic over a secure telecommunications system. The method comprises the steps of receiving traffic from a network at a switch connected to the network. Then there is the step of directing traffic to a first inspection engine connected to the switch and to a second inspection engine connected to the switch. Next there is the step of receiving traffic at the first inspection engine. Then there is the step of processing traffic received at the first inspection engine to determine whether it is desired traffic or undesired traffic. Next there is the step of sending the desired traffic back to the switch from the first inspection engine and discarding undesired traffic from the first inspection engine. Then there is the step of transferring desired traffic received by the switch from the first inspection engine to a first destination. Next there is the step of processing traffic received at the second inspection engine to determine whether it is desired traffic or undesired traffic. Then there is the step of sending the desired traffic back to the switch from the second inspection engine and discarding undesired traffic from the second inspection engine. Next there is the step of transferring desired traffic received by the switch from the second inspection engine to a second destination.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
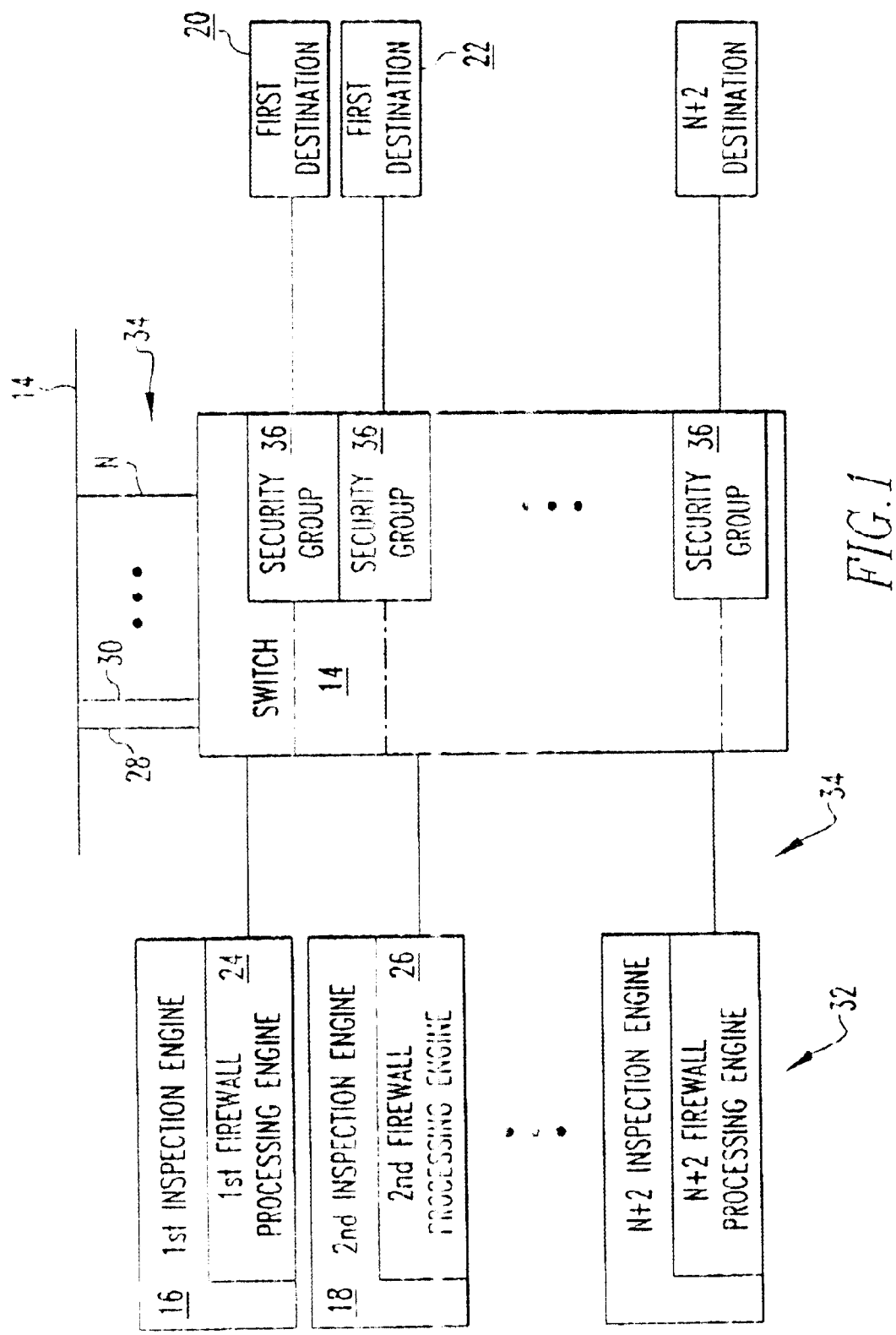
FIG. 1 is a schematic representation of a system of the resent invention.

Referring now to the drawings wherein like reference numerals refer to similar or identical parts throughout the several views, and more specifically to FIG. 1 thereof, there is shown a secure telecommunications system 10. The system 10 comprises a network 12 on which traffic travels. The system 10 comprises a switch 14 connected to the network 12. The system 10 comprises a first inspection engine 16 connected to the switch 14, which receives traffic from the switch 14, processes the traffic to determine whether it is desired traffic or undesired traffic, which prevents undesired traffic from passing through it and which sends desired traffic back to the switch 14. The system 10 comprises a second inspection engine 18 connected to the switch 14, which receives traffic from the switch 14, processes the traffic to determine whether it is desired traffic or undesired traffic, which prevents undesired traffic from passing through it and which sends desired traffic back to the switch 14. The system 10 comprises a first destination 20 connected to the switch 14 which receives desired traffic from the switch 14 that has been processed by the first inspection engine 16. The system 10 comprises a second destination 22 connected to the switch 14 which receives desired traffic from the switch 14 that has been processed by the second inspection engine 18.

Preferably, the first inspection engine 16 includes a first firewall processing engine 24 and the second inspection engine 18 includes a second firewall processing engine 26. The switch 14 preferably has a first port 28 and a second port 30 connected to the network 12 which receives traffic from the network 12. The switch 14 directing traffic received at the first port 28 to the first firewall processing engine 24 and directing traffic received at the second port 30 to the second firewall processing engine 26.

Preferably, the system 10 includes N additional firewall processing engines 32 connected to the switch 14 besides the first firewall processing engine 24 and the second firewall processing engine 26 so there are a total of N+2 firewall processing engines 32, where N is greater than or equal to 1 and is an integer. The switch 14 preferably has N additional ports 34 besides the first port 28 and the second port 30, wherein each port is connected to a corresponding firewall processing engine.

Figure 2:
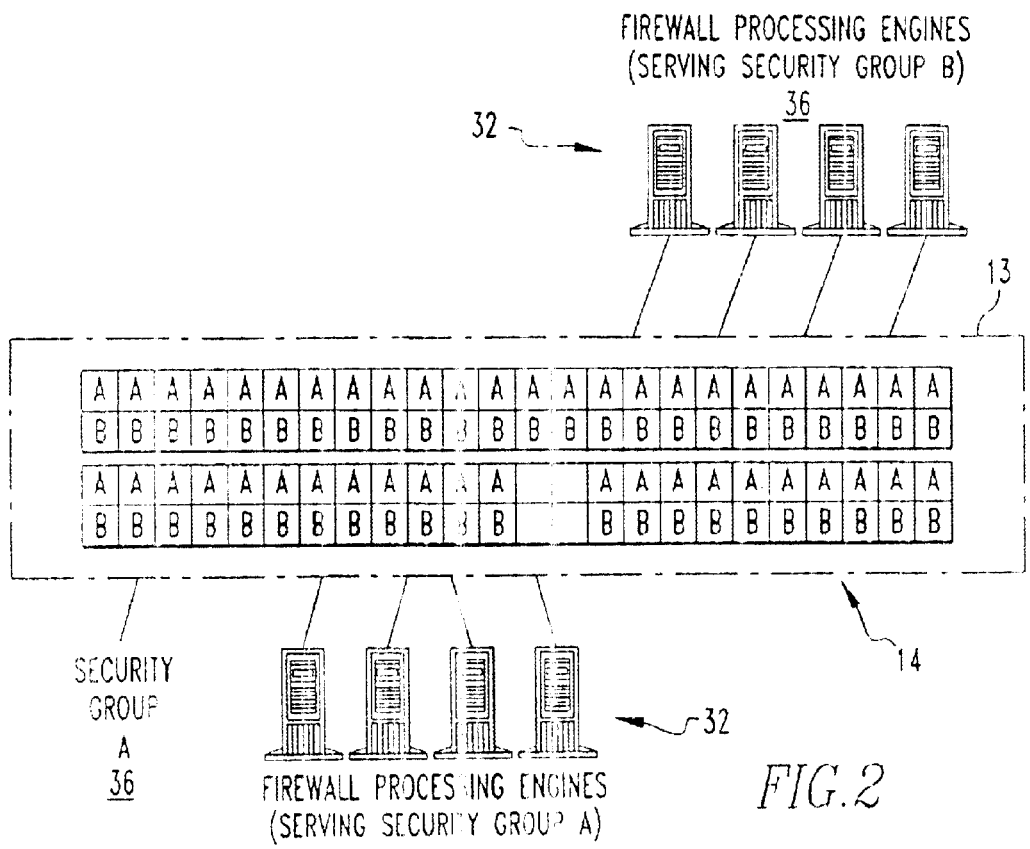
FIG. 2 is a schematic representation of another embodiment of a system of the present invention.

Preferably, the switch 14 is configured into security groups 36, as shown in FIG. 2, with at least one of the N+2 firewall processing engines 32 serving each security group 36. The switch 14 preferably load-shares traffic for each security group 36 across corresponding firewall processing engines 32 serving the corresponding security group 36. Preferably, the switch 14 rebalances traffic for a security group 36 when one of the firewall processing engines 32 serving the security group 36 fails across the other firewall processing engines 32 serving the security group 36. The switch 14 preferably is scalable to allow for adding firewall processing engines 32.

Preferably, the traffic includes bits and wherein the firewall processing engines 32 serving a first security group 36a of the security groups 36 encrypt greater than 1 Gbps of traffic. The network 12 preferably includes the Internet, and the first destination 20 includes a first web server and the second destination 22 includes a second web server. Preferably, the Internet includes a LAN.

The present invention pertains to a method for sending traffic over a secure telecommunications system 10. The method comprises the steps of receiving traffic from a network 12 at a switch 14 connected to the network 12. Then there is the step of directing traffic to a first inspection engine 16 connected to the switch 14 and to a second inspection engine 18 connected to the switch 14. Next there is the step of receiving traffic at the first inspection engine 16. Then there is the step of processing traffic received at the first inspection engine 16 to determine whether it is desired traffic or undesired traffic. Next there is the step of sending the desired traffic back to the switch 14 from the first inspection engine 16 and discarding undesired traffic from the first inspection engine 16. Then there is the step of transferring desired traffic received by the switch 14 from the first inspection engine 16 to a first destination 20. Next there is the step of processing traffic received at the second inspection engine 18 to determine whether it is desired traffic or undesired traffic. Then there is the step of sending the desired traffic back to the switch 14 from the second inspection engine 18 and discarding undesired traffic from the second inspection engine 18. Next there is the step of transferring desired traffic received by the switch 14 from the second inspection engine 18 to a second destination 22.

Preferably, the first and second inspection engines 18 include a first firewall processing engine 24 and a second firewall processing engine 26, respectively, and wherein the directing traffic step includes the step of directing traffic to the first firewall processing engine 24 and second firewall processing engine 26 and to a third firewall processing engine and a forth firewall processing engine. The switch 14 is preferably configured into a first security group 36a and a second security group 36b, and the receiving step includes the step of receiving traffic at the first security group 36a.

Preferably, the directing step includes the step of directing the traffic from the first security group 36a of the switch 14 to the first, third and fourth firewall processing engines 32 which serve the first security group 36a of the switch 14, and directing traffic to the second firewall processing engine 26 serving the second security group 36b of the switch 14. The receiving step preferably includes the step of receiving traffic from the first security group 36a at a first port 28 of the switch 14 and receiving traffic for the second security group 36b at a second port 30 of the switch 14. Preferably, the directing the traffic from the first security group 36a includes the step of load-sharing by the switch 14 the traffic received by the first security group 36a between the first, third and fourth firewall processing engines.

The directing the traffic from the first security group 36a step preferably includes the step of rebalancing traffic from the first security group 36a to the third and fourth firewall processing engines when the first firewall processing engine 24 fails. Preferably, after the step of transferring traffic to the first destination 20, there is the step of connecting a fifth firewall processing engine to the switch 14.

In the operation of the invention, the system 10 allows the network 12 owner to specify a subset of traffic which needs to be processed by a set of external processing devices, cull that traffic out, send it over to the devices, retrieve it, and forward it (now processed) to its destination. The culling can be done on any set of parameters inside the packet header.

This makes for a remarkably flexible and scalable packet processing system 10. This will be useful for banks, anyone who needs high-speed security, it can be used for massive encryption (1 Gbps and above), and a number of other applications that require the efforts of a number of CPU's to be grouped together. This system 10 basically acts as the taskmaster for a parallel processing platform.

A firewall processing engine 32, which is a combination of a hardware platform and a special software program, is a security computer that is normally implemented by situating the firewall processing engine 32 "in-line" between the internal and external networks. In these implementations, data traffic must pass through and be approved by the relatively slow hardware/software combination in order to pass through to the internal network. The system 10 moves the firewall processing engine 32 from the normal in-line position to a port of a special switching router that is in-line.

In FIG. 2, there are two security groups 36 configured on the switch 14 (A & B). Any traffic coming in those groups are pre-filtered (based on user-input filters), and sent to the firewall processing engines 32 for inspection. Traffic is load-shared across the engines based on a combination of input port and L2 parameters (L2 parameters are well known to one skilled in the art).

Once the traffic is redirected to the appropriate firewall processing engine, that particular engine will perform its programmed operations and returns the packet back to the switch 14, whereupon the switch 14 will forward it to its final destination.

If one of the firewall processing engines 32 fails, then the switch 14 will re-balance the traffic across the remaining engines. Currently, a failure is considered to be "link-down". More sophisticated failure detection algorithms are easy to implement with this system 10.

Figure 3:
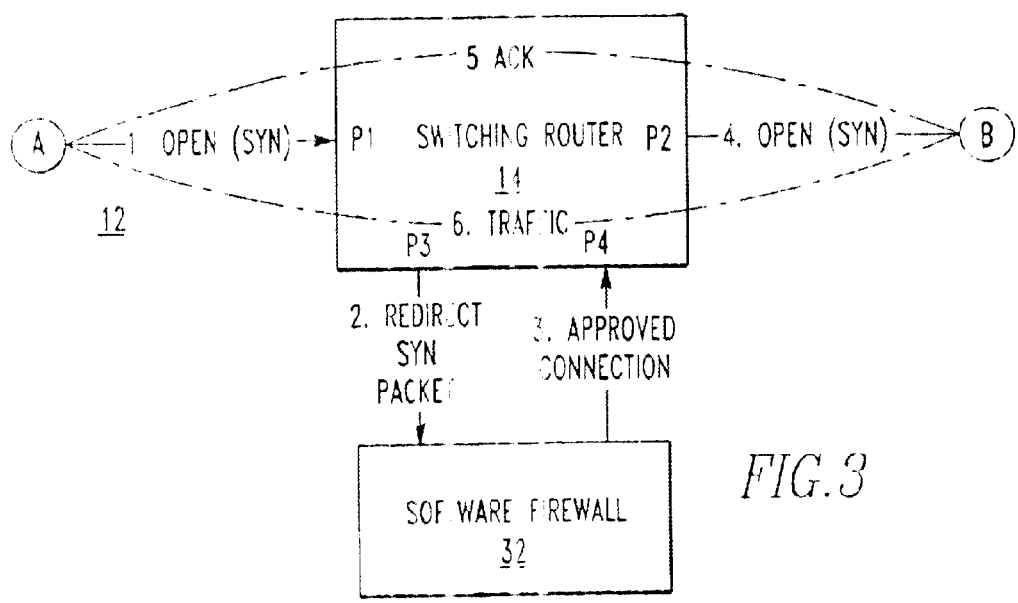
FIG. 3 is a schematic representation of another embodiment of a system of the present invention.

FIG. 3 shows a basic configuration of the switching router 14, firewall processing engine 32, and external and internal networks A, B, respectively. As shown in FIG. 3, the firewall processing engine 32 is not in-line between the two networks (A & B).

The switching router 14 includes customized application specific integrated circuits ("ASICs"). These ASICs are designed to detect certain types of data packets that signify the opening and closing of a particular connection, as is well known in the art, and to then route them to the firewall processing engine 32. The firewall processing engine 32 verifies whether a particular connection request from external point A should be permitted, and if so, redirects the opening packet to the router for transmission to its intended destination on internal network B.

The system 10 is particularly well suited for use in connecting an internal network to external networks that communicate using the Transmission Control Protocol ("TCP"), which is the protocol used to carry data packets over the Internet. TCP is a connection-oriented protocol, meaning that before any communication can occur between two endpoints, a logical connection must be established so that both endpoints can expect the traffic. Data packets will not be accepted until the logical connection has been established. TCP uses certain opening and closing packets, known respectively as "SYN" and "FIN" packets. The first packet in a TCP communication session is the "SYN" packet and the last packet is the "FIN" packet. Each packet also includes the source and destination addresses of the two endpoints, as well as information that identifies the type of service that is being requested.

Referring now to FIG. 3, the firewall processing engine 32 operates as follows. A communication session begins when a computer on external network A sends a TCP open (SYN) packet to port 1 (P1) of the switching router 14. The switching router 14 includes the special ASICs that are capable of detecting the SYN and FIN packets. The router 14 detects the SYN packet from port 1 and redirects it to port 3 (P3), which is connected to the input of the software firewall processing engine 32. The firewall processing engine 32 examines the SYN packet, its associated source/destination addressing information, its requested service type, etc., in order to determine if the connection is permitted. The software firewall processing engine 32 would also include the ability to allow or not allow particular connections for many reasons, such as not permitting connections from particular domains, not permitting connections for particular services, etc., as is well known in the art.

If the connection is allowed, the SYN packet is routed back to the switching router 14 via port 4 (P4), and the router 14 then redirects the SYN packet to endpoint B in order to open the connection. If the connection request was not allowed by the software firewall processing engine 32, then the SYN packet would not have been redirected to B, and no connection would be established. After the computer at endpoint B receives the redirected SYN packet, it transmits an ACK (acknowledge) packet to endpoint A via the router, thereby indicating that a connection has been established. Normal packet traffic can then flow between points A and B, directly through the router 14, without being redirected to the software firewall processing engine 32.

The software firewall processing engine 32 maintains a list of the allowed and presently established connections. When the FIN packet for a particular connection is detected by the router 14, it is redirected to the software firewall processing engine 32, so that the connection can be properly cleared from the list of allowed connections. The FIN packet is then forwarded to endpoint B in order to close out the connection.

In the system 10, there is no communication channel established between the software firewall processing engine 32 and any external computer. The firewall processing engine 32 only communicates with the switching router by receiving SYN packets from port 3 (P3) for approval and transmitting those that are approved back to the router 14 via port 4 (P4). Because the system 10 is designed to be completely transparent to the external network, there would be no need to create such a connection between the firewall processing engine 32 and any external system.

The engines do not have to be firewall engines—they can be any sort of traffic inspection/modification algorithm that the user can dream up. The system 10 specifies the ways and means of getting the traffic to and from that bank of processors.

The system's 10 load-sharing/redundancy scheme solves both the performance problem (by spreading the load across multiple CPUs) and the redundancy problem (by implementing a failover scheme).

There are two "physical" components and five "functional" components to the systems 10. The physical components are an exponeNT switching platform and a Check Point FireWall-1 firewall. The combination of these two physical components (with some software to hold them together) provides the following functional components: Packet Filtering, TCP Connection Inspection, UDP re-direction and software firewalling, and ICMP re-direction and software firewalling. The whole system 10 provides gigabit speed TCP/IP firewalling, line-rate switching and routing, strong QoS, ease of manageability, and strong resilience against failure.

Packet Filtering

There are two aspects to packet filtering; generic filters for user configuration, and security specific filters for filtering out and dealing with certain types of attacks.

Generic Packet Filters

Generic filters differ from filters on the traditional software-based routers in that implementation of these filters incurs no performance penalty. The following is an (edited) note from CERT, incorporated by reference herein, which outlines a reasonable filtering schema which will be used as the suggested base for the system 10:

"The CERT staff encourages system managers, site network managers, and regional network providers to take the time to understand packet filtering issues. Because of the flaws in several TCP/IP services, a site must be able to restrict external access to these services. Sites should consider purchasing programmable routers. Network providers should offer packet filtering as a service option. Because of flaws in the protocol or chronic system administration problems, we recommend that the following services be filtered:

DNS zone transfers—socket 53(TCP)

We suggest that sites filter socket 53(TCP) to prevent domain name service zone transfers. Permit access to socket 53(TCP) only from known secondary domain name servers. This prevents intruders from gaining additional knowledge about the systems connected to your local network tftpd—socket 69 (UDP)

We have handled incidents that involved automated TFTP attempts. Many of the systems affected were using the TFTP daemon to boot other devices. Filtering TFTP connections would have protected the sites from this attack.

link—socket 87 (TCP) (commonly used by intruders)

SunRPC & NFS—socket 111 and 2049 (UDP and TCP)

BSD UNIX "r" commands—sockets 512, 513, and 514 (TCP)

lpd—socket 515 (TCP)

uucpd—socket 540 (TCP)

openwindows—socket 2000 (UDP and TCP)

X windows—socket 6000+(UDP and TCP)

The X windows sockets range from socket 6000 to 6000 plus the highest number of X terminals on the same host. If your site does not need to provide other services to external users, those other services should be filtered. For example, filter telnet connections when all staff members are in the office, and filter FTP connections to all systems except to public information servers. In addition to filtering specific services, we recommend that sites also filter based on the source address field of the packets to prevent IP spoofing. More information on this technique can be found in CERT advisory CA-95:01, "IP Spoofing Attacks and Hijacked Terminal Connections," available by anonymous FTP To prevent denial of service attacks based on ICMP bombs, filter ICMP redirect and ICMP destination unreachable packets.

In addition, sites should filter source-routed packets."

Blindly implementing this filtering in a LAN would cause all sorts of problems. For example, it is clearly not desirable to filter all Ipd traffic on a LAN where you're expecting to use UNIX printing services. However, a truly secure site might desire to restrict that traffic to those LAN segments that really are going to be using the service. Same with NFS, openwindows, and all of the other services mentioned. This is merely a generic overview of how filtering can help by closing certain security holes.

Security Specific Filtering

There are some attacks that switching hardware needs to deal with directly, either to performance-augment the software firewall, or because using the software firewall in the BNI configuration will disable the software firewall's ability to defend against these attacks. These are not meant to replace (nor will they ever be meant to replace) the software firewall, they are meant to augment its functionality. These filters are as follows:

LAND attack filters (drop Source IP=Dest IP packets)

Teardrop attack filters (drop Fragment offset=1 packets)

IP spoofing filters (2 types; 1=check reverse path forwarding table; 2=check manually input list of valid source IP addresses for a port)

SMURF attack filters

TCP Connection Inspection

TCP Connection Inspection (also referred to as TCP cut-through) is probably the most interesting part of the LSS. Many TCP attacks against services which cannot simply be filtered out can be defended against by a software based firewall that keeps state (vs. a stateless filter). The most intuitive way of implementing this is to simply place a software firewall in line with every "protected" port. Unfortunately, there are still performance issues with this even with the fastest software firewalls on the market (e.g. Gigabit Ethernet connections are unprotectable).

The system 10 redirects the TCP connection packets to the software firewall, and allows the firewall to make the decision to forward the packet. Note that these are only the packets related to the actual opening of the connection; all other packets are forwarded as per their header information. If those packets aren't forwarded, then the connection never opens, and any subsequent packets would be dropped by the endstation. This functionality is exactly how the Check Point FireWall-1 product (available for purchase from Check Point), incorporated by reference herein, works when put in fastpath mode. The system 10 is taking the burden of forwarding the packets off of FireWall-1 and placing it in hardware.

This means that for long-lived, high volume connections, the performance can be much greater than with a software forwarding agent (as is the norm in firewalling.) The flip side of this is that the performance is tied to the "connection bandwidth" of the software firewall.

The Check Point FW-1 Software firewall is the firewall of choice for the system 10. Testing of FireWall-1 on a PII/400 MHz machine indicates that FireWall-1 can support about 8000 connections/second when not burdened with forwarding the subsequent connection traffic.

Note that if there is only one firewall, and that firewall breaks, the customer will lose TCP connectivity on all of the firewalled ports 34. This is clearly unacceptable. There are also situations where the customer is going to need more than 8000 connections/second.

Fortunately, there is a mechanism by which to achieve both of these goals—redundancy and load balancing across multiple firewalls. The system 10 is implementing a trunking mechanism for use by inter-switch links. Any traffic coming in a certain port will be sent out a certain port in a trunk group. The trunk group, instead of terminating at another switch 14, can terminate on a group of firewalls, one firewall per trunk group link. There are multiple load-sharing mechanisms in place, but their purpose is identical—share load and implement redundancy.)

FireWall-1, on its side, can synchronize state between multiple firewalls. E.g. any connection that is cached in its connection table will be cached in the other firewalls within 50 ms. While this turns out to not be relevant for TCP (when running in fastpath mode) (see below), it is very relevant for UDP. The concept of a group of firewalls all serving the same set of ports 34 is known as a "firewall pool".

FireWall-1 has a normal mode and fastpath mode. The normal mode inspects every packet, and caches connection state for every connection (or flow, TCP or otherwise). When in normal mode, all of the relevant TCP state packets (SYN, FIN, and ACK) need to be directed to the firewall. The FireWall-1 fastpath mode relies on the control mechanisms of TCP to correctly setup and tear down the connections, and so, only the SYN packets need to be directed to the firewall. (Which, when in fastpath mode, never caches connection state.) If it is desired to defend against SYN flooding attacks, the 1st ACK packet (non SYN/ACK) must also be directed to the firewall (this functionality is currently under investigation).

Since defending against SYN flooding requires ACK packets to be forwarded to the firewall system 10, it raises the question of sending the ACK packet to the firewall on which the original SYN was sent. This is not necessary, so the ACK packet can be sent to any firewall within the group of firewalls on the trunk links, and the FW-1 synchronization system 10 will deal with updating the state on the rest of the firewalls.

With FTP, it is desirable to have a mode whereby all traffic on the control channel is redirected to the software firewalls. The data channel is thence treated as a regular TCP connection. As the TCP control channel has its own dest TCP port, it is easy to segregate this traffic out and send it to the firewall system 10. The same holds true for SMTP traffic—all of it is currently redirected to FireWall-1 for full inspection (and content vectoring if relevant). This is the default behavior of the system 10.

The implementation of generic TCP/UDP filters on the exponeNT hardware allows for any application to be either cut-through without any inspection by FireWall-1 or fully inspected by FireWall-1. The implementation of generic IP source and/or destination filters on the exponeNT hardware allows for the same behavior for traffic coming from or going to any IP host or network 12.

UDP Re-Direction and Firewalling

UDP, being connectionless, doesn't have the manipulability of TCP for connection blocking purposes. However, certain protocols (NFS, for example), are very UDP, and can reveal sensitive information. Since UDP traffic is a small percentage of total traffic on the LAN, all UDP traffic can be sent through the firewalls. The use of firewall pools becomes very important for high-bandwidth UDP traffic.

FW-1 doesn't differentiate between fastpath and slowpath for UDP traffic. All traffic is inspected, and thus entries are made in the connection tables for each of the flows. Thus, synchronization between firewalls is important, and the number of flows that can be handled concurrently is also important. The number that was cited to me from Checkpoint is that FW-1 can handle approx. 25,000 concurrent connections.

IICMP Re-Direction and Firewalling

ICMP traffic would be handled in the same way as UDP traffic.

Configuration and Management

The system 10 requires configuration of both the exponeNT hardware (through the eVision management platform) and the FireWall-1 software.

One configuration that the system 10 uses is the "security group". Any set of ports 34 can be configured into a security group 36. A security group 36 shares a single firewall pool (and vice-versa, a single firewall pool only serves a single security group 36). Up to 16 security groups 36 can be configured on the switch 14, and up to 4 firewalls per firewall-pool. This allows for massive scalability and flexibility in performance and security. Traffic can pass between security groups 36 (if allowed by the policies).

One non-intuitive bit of configuration is that all security is applied at the input port level, e.g. traffic coming in port 1A1 is firewalled. This means that one must place all of the ports 34 that might have "bad-guys" attached to them into the relevant security groups 36.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A secure telecommunications system comprising:
   an external network on which traffic travels;
   a switch connected to the external network;
   an internal network connected to the switch;
   a first inspection engine connected to the switch and not in line with the internal network and the external network, which receives traffic from the switch, processes the traffic to determine whether it is desired traffic or undesired traffic, which prevents undesired traffic from passing through it and which sends desired traffic back to the switch;
   a second inspection engine connected to the switch and not in line with the internal network and the external network, which receives traffic from the switch, processes the traffic to determine whether it is desired traffic or undesired traffic, which prevents undesired traffic from passing through it and which sends desired traffic back to the switch;
   a first destination connected to the switch through the internal network which receives desired traffic from the switch that has been processed by the first inspection engine; and
   a second destination connected to the switch through the internal network which receives desired traffic from the switch that has been processed by the second inspection engine.

2. A system as described in claim 1 wherein the first inspection engine includes a first firewall processing engine and the second inspection engine includes a second firewall processing engine.

3. A system as described in claim 2 wherein the switch has a first port and a second port connected to the external network which receives traffic from the external network, said switch directing traffic received at the first port to the first firewall processing engine and directing traffic received at the second port to the second firewall processing engine.

4. A system as described in claim 3 including N additional firewall processing engines connected to the switch besides the first firewall processing engine and the second firewall processing engine so there are a total of N+2 firewall processing engines, where N is greater than or equal to 1 and is an integer.

5. A system as described in claim 4 wherein the switch has N additional ports besides the first port and the second port, wherein each port is connected to a corresponding firewall processing engine.

6. A system as described in claim 5 wherein the switch is configured into security groups with at least one of the N+2 firewall processing engines serving each security group.

7. A system as described in claim 6 wherein the switch load-shares traffic for each security group across corresponding firewall processing engines serving the corresponding security group.

8. A system as described in claim 7 wherein the switch rebalances traffic for a security group when one of the firewall processing engines serving the security group fails across the other firewall processing engines serving the security group.

9. A system as described in claim 8 wherein the switch is scalable to allow for adding firewall processing engines.

10. A system as described in claim 9 wherein the traffic includes bits and wherein the firewall processing engines serving a first security group of the security groups encrypt greater than 1 Gbps of traffic.

11. A system as described in claim 10 wherein the external network includes the Internet, and the first destination includes a first web server and the second destination includes a second web server.

12. A system as described in claim 11 wherein the Internet includes a LAN.

13. A method for sending traffic over a secure telecommunications system comprising the steps of:
    receiving traffic from an external network at a switch connected to the external network and an internal network;
    directing traffic to a first inspection engine connected to the switch and not in line with the internal network or the external network, and to a second inspection engine connected to the switch and not in line with the internal network or the external network;
    receiving traffic at the first inspection engine;
    processing traffic received at the first inspection engine to determine whether it is desired traffic or undesired traffic;
    sending the desired traffic back to the switch from the first inspection engine and discarding undesired traffic from the first inspection engine;
    transferring desired traffic received by the switch from the first inspection engine to a first destination through the internal network;
    processing traffic received at the second inspection engine to determine whether it is desired traffic or undesired traffic;
    sending the desired traffic back to the switch from the second inspection engine and discarding undesired traffic from the second inspection engine; and
    transferring desired traffic received by the switch from the second inspection engine to a second destination through the internal network.

14. A method as described in claim 13 wherein the first and second inspection engines include a first firewall processing engine and a second firewall processing engine, respectively, and wherein the directing traffic step includes the step of directing traffic to the first firewall processing engine and second firewall processing engine and to a third firewall processing engine and a forth firewall processing engine.

15. A method as described in claim 14 wherein the switch is configured into a first security group and a second security group, and the receiving step includes the step of receiving traffic at the first security group.

16. A method as described in claim 15 wherein the directing step includes the step of directing the traffic from the first security group of the switch to the first, third and fourth firewall processing engines which serve the first security group of the switch, and directing traffic to the second firewall processing engine serving the second security group of the switch.

17. A method as described in claim 16 wherein the receiving step includes the step of receiving traffic from the first security group at a first port of the switch and receiving traffic for the second security group at a second port of the switch.

18. A method as described in claim 17 wherein the directing the traffic from the first security group includes the step of load-sharing by the switch the traffic received by the first security group between the first, third and fourth firewall processing engines.

19. A method as described in claim 18 wherein the directing the traffic from the first security group includes the step of rebalancing traffic from the first security group to the third and fourth firewall processing engines when the first firewall processing engine fails.

20. A method as described in claim 19 wherein after the step of transferring traffic to the first destination, there is the step of connecting a fifth firewall processing engine to the switch.

* * * * *

UNITED STATES PATENT AND TRADEMARK OFFICE
CERTIFICATE OF CORRECTION

PATENT NO. : 6,901,517 B1 Page 1 of 1
APPLICATION NO. : 09/356086
DATED : May 31, 2005
INVENTOR(S) : Redmore It is certified that error appears in the above-identified patent and that said Letters Patent is hereby corrected as shown below:

On the Title Page, in Field (52), under "U.S. Cl.", in Column 1, Line 1, delete "713/202;" and insert -- 713/200; --, therefor.

On the Title Page, in Field (58), under "Field of Search", in Column 1, Line 2, delete "709/227," and insert -- 709/229, --, therefor.

In Column 2, Line 13, delete "resent" and insert -- present --, therefor.

In Column 9, Line 4, delete "IICMP" and insert -- ICMP --, therefor.

In Column 11, Line 5, in Claim 14, delete "forth" and insert -- fourth --, therefor.

Signed and Sealed this

Fourteenth Day of October, 2008

JON W. DUDAS
*Director of the United States Patent and Trademark Office*